J. H. RAM.
OIL AND GREASE DEFLECTOR.
APPLICATION FILED AUG. 27, 1920.

1,417,410.

Patented May 23, 1922.

John H. Ram, INVENTOR

BY Victor J. Evans, ATTORNEY

WITNESS

UNITED STATES PATENT OFFICE.

JOHN H. RAM, OF JERSEY CITY, NEW JERSEY, ASSIGNOR OF ONE-HALF TO EDGAR E. ELDER, OF BROOKLYN, NEW YORK.

OIL AND GREASE DEFLECTOR.

1,417,410.  Specification of Letters Patent.  Patented May 23, 1922.

Application filed August 27, 1920. Serial No. 406,470.

*To all whom it may concern:*

Be it known that I, JOHN H. RAM, a citizen of the United States, residing at Jersey City, in the county of Hudson and State of New Jersey, have invented new and useful Improvements in Oil and Grease Deflectors, of which the following is a specification.

This invention relates to improvements in oil and grease deflectors.

The principal object is to provide an oil deflector which shall be simple of construction, cheap to manufacture and efficient for the purpose for which it is designed.

Another object is to form such a device with a conduit which will deliver the waste oil at a predetermined desired place.

Other objects will appear from the following description and claims.

All of these objects are attained by the mechanism shown in the accompanying drawing, in which.

Like characters of reference refer to like parts in both views.

Figure 1:
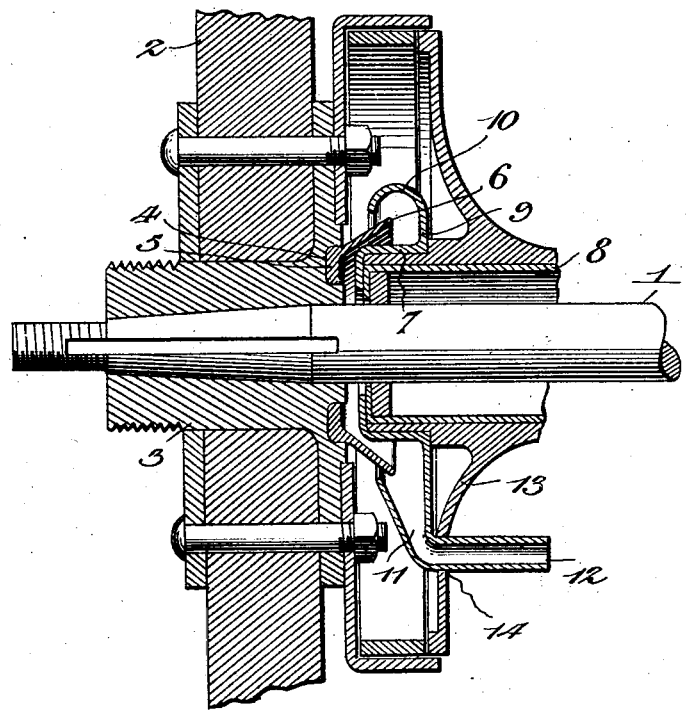
Figure 1 is a vertical sectional view of a portion of the rear of an automobile with my improvement attached, the section being taken along the line of the rear axle.
Figure 2:
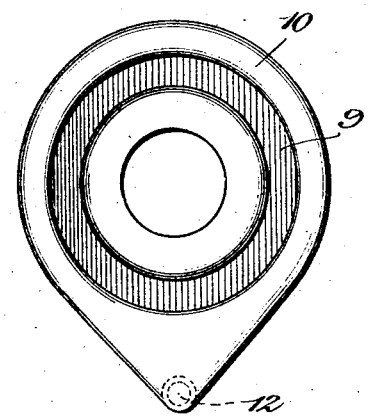
Figure 2 is a side elevation of my improvement detached.

This invention contemplates the providing of a simple and efficient oil deflector; and while it is shown as applied to an automobile of a certain type, it is to be understood that the invention has in view the use of the device for any type of automobile and for other machines where such a device may be desirable.

Referring more particularly to the drawings, 1 represents the rear axle and 2 the rear wheel of a Ford automobile. The hub 3 of the wheel is provided as it comes from the factory with an annular groove 4 in which is normally seated a felt washer. For the purpose of the present invention, the aforesaid felt washer is removed from the groove 4 and in its place is substituted a member having an annular portion 5 which is a micrometer or driving fit for the groove 4, and with a frusto-conical portion 6.

A second member is provided with a cuplike portion 7 which is made as a driving fit for the rear axle housing 8, from which cup-like portion or axle housing cap there extends a flange portion 9 which is formed into an annular groove 10 that encloses the free rim of the conical portion 6 above described. At its lower portion, the annulus 10 is graduated downwardly into a pocket 11 which connects with a short pipe 12. An aperture is drilled in the brake-shoe support 13 at 14 and through this aperture the pipe 12 is thrust and then given a slight bend which maintains the device in place.

It will be readily understood that as the oil and grease works its way along the axle 1, it will be thrown onto the member 5—6 which acts as an oil slinger to throw the oil into the annular groove 10 from which it runs into pocket 11 and is conducted through tube 12 either into a receptacle for the purpose, or to a place where it drops free from the car and does not clog or clot the brake and other working parts.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What I claim as new and desire to secure by Letters Patent is:—

1. In a device of the class described, the combination of a member including a portion for attachment to a rotary member, and a conical oil-slinging portion, an axle-housing cap member having an annular groove adapted to co-act with the first said member for catching and conducting oil thrown off from the first said member.

2. In a device of the class described, the combination of an oil-slinger adapted to be attached to a rotary member, a member adapted to act as a cap for an axle housing and provided with means for receiving and directing the oil thrown from said oil-slinger, and a tube attached to said member and adapted to conduct the oil to a predetermined position.

3. In a device of the class described, the combination of an oil-slinger adapted to be secured to a rotary member, a member adapted to be stationarily supported and comprising a flange formed to provide an oil-receiving groove and an oil-collecting pocket, and a member secured to said pocket of said flange.

4. In a device of the class described, the combination of an oil-slinger adapted to be secured to a rotary member, a member adapted to be stationarily supported and comprising a flange formed to provide an oil-receiving groove and an oil-collecting pocket, and a member secured to said pocket of said flange for conducting the oil therefrom and adapted to maintain said member in proper position.

5. A deflector for automobiles comprising a conical oil slinger adapted to be secured to the wheel, an axle housing cap formed with an extended flange enclosing the free end of said oil slinger, and a tube secured to said axle cap and operable for holding said cap in place.

In testimony whereof I have affixed my signature.

JOHN H. RAM.